Feb. 16, 1954
H. J. HEPP
2,669,591
PROCESS FOR CONVERSION OF HYDROCARBONS WITH
COMBUSTION GAS AND FINELY DIVIDED CATALYST
Filed Dec. 31, 1948
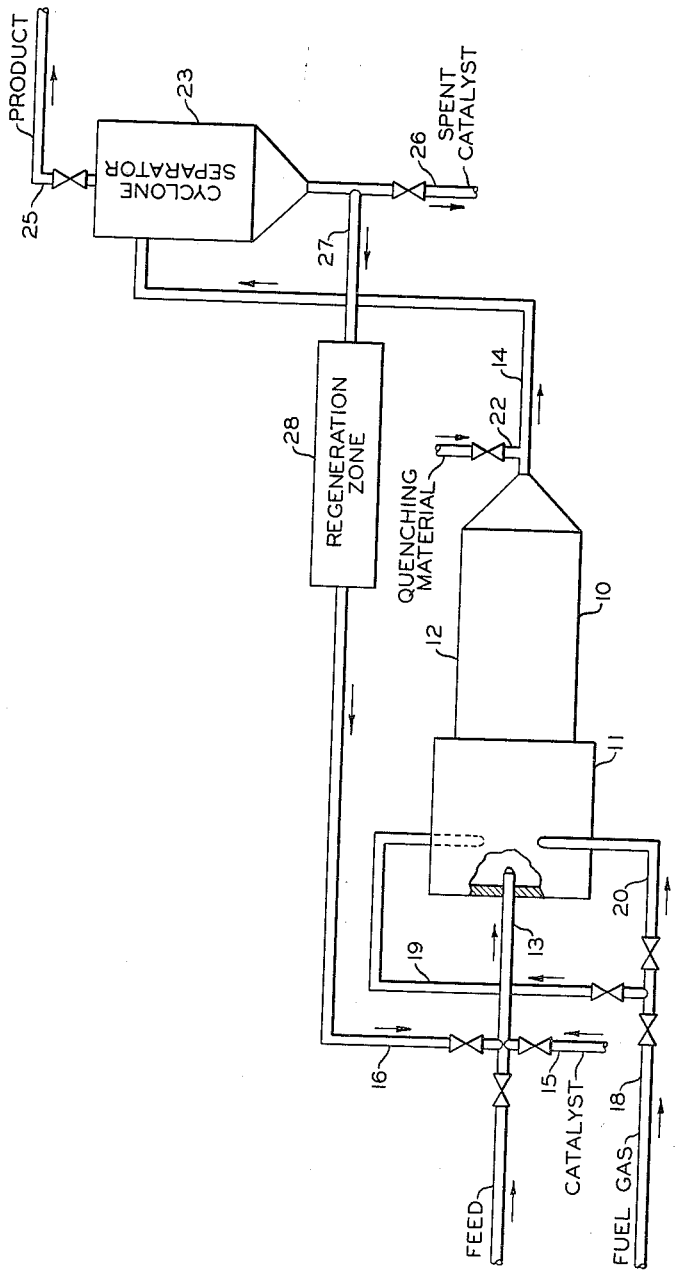
INVENTOR.
H. J. HEPP
BY Hudson & Young
ATTORNEYS Patented Feb. 16, 1954

2,669,591

UNITED STATES PATENT OFFICE 2,669,591

PROCESS FOR CONVERSION OF HYDROCARBONS WITH COMBUSTION GAS AND FINELY DIVIDED CATALYST

Harold J. Hepp, Bartlesville, Okla., assignor to Phillips Petroleum Company, a corporation of Delaware Application December 31, 1948, Serial No. 68,473

2 Claims. (Cl. 260—683.3)

This invention relates to a method of catalytically converting hydrocarbons. In a more specific aspect, it relates to a method of catalytic dehydrogenation of hydrocarbon materials such as butane.

In accordance with my invention, hydrocarbons are catalytically converted in an elongated reaction vessel in which hot combustion gases flow in a spiral path around an axially moving hydrocarbon stream containing a suspended finely divided catalyst, thereby to heat such hydrocarbon stream to conversion temperature. In some cases, the hot combustion gases may be introduced into the reaction vessel in such manner as to produce high turbulence without the aforementioned spiral flow, the reactor being properly sized to produce sufficient residence time as to effect the desired conversion reaction. The effluent from the reaction zone is preferably quenched and then fed to a suitable separator to remove spent catalyst from the reaction products, this spent catalyst being regenerated and recycled in a manner familiar to those skilled in the art. The gaseous product from this separation consists of converted hydrocarbons together with combustion gases, and this material is charged to a second separation zone from which is recovered the desired converted product together with a recycle stock and the uncondensable gases present in the combustion gases and feed stock.

The method of this invention is particularly applicable to the catalytic dehydrogenation of saturated hydrocarbons such as butane, but it also finds application in other types of catalytic reactions, such as cracking, hydroforming isomerization, polymerization, and alkylation of hydrocarbon feed stocks. The novel method of the present invention permits the conversion reactions to be conducted at high throughput while the spiral flow of hot combustion gases provides a highly efficient heat transfer between the fuel gases and the hydrocarbon stream to be converted.

It is an object of my invention to provide an improved method for catalytically converting hydrocarbons.

It is a further object of my invention to effect such catalytic hydrocarbon conversions at high throughput and with very efficient heat transfer between the feed stream and a stream of hot combustion gases.

Various other objects, advantages and features of the invention will become apparent from the following disclosure, taken in conjunction with the accompanying drawing, in which the figure is a flow diagram illustrating the catalytic dehydrogenation of n-butane.

Referring now to the drawing in detail, I have shown a reaction vessel 10, preferably formed from steel, of the type utilized in the manufacture of carbon black. The vessel includes an enlarged cylindrical section 11 and an elongated cylindrical section 12 of reduced cross section.

Feed is introduced into the central region of cylindrical section 11 through a line 13 and this material flows successively through the section 11 and the section 12 in an axial path to an outlet line 14. A finely divided catalyst may be admitted to inlet 13 through a line 15 and recycled catalyst may be admitted to inlet 13 through a line 16. Accordingly, the charge to the reaction vessel consists of a stream of feed stock containing suspended finely divided catalyst material. If desired, the catalyst may be introduced separately into the reaction vessel through manifolds disposed at the central region of the enlarged cylindrical section 11, in which case intimate contacting between the catalyst and feed stock is effected within the reaction vessel.

In accordance with the invention, a large variety of feed stocks may be introduced through inlet 13 for catalytic conversion within the reactor 10. A preferred feed stock is n-butane which may be mixed with a suitable finely divided dehydrogenation catalyst, preferably an active, heat-stable type such as a stabilized chromia-alumina catalyst. The catalyst to feed ratio may vary between 0.5 to 5 pounds of catalyst per pound of butane feed stock, a preferred ratio being two pounds of catalyst per pound of feed stock. Thus, in a typical case, n-butane is charged to the reactor at the rate of 25,600 cubic feet per hour and catalyst is introduced at a rate of 7,860 pounds per hour. The size of the catalyst particles in the preferred example may vary between 100 and 300 mesh. In the application of the invention to the catalytic cracking of gas oil feed stocks, an active finely divided catalyst such as silica-alumina, or silica-zirconia may be used, and this material may also be used in the catalytic cracking of naphthas, light hydrocarbons, or kerosene stocks. The present invention is also applicable to the reforming of gasoline, and to the alkylation of aromatic compounds, such as benzene, by olefins, such as ethylene, in which case the catalyst may be cadmium pyrophosphate. In the polymerization of olefins, such as propylene, the catalyst may consist of phosphoric acid suspended on silica or kieselguhr. In the catalytic hydrogenation of olefins to form paraffins, the catalyst employed may be nickel or cobalt on silica or silica-alumina.

In accordance with the invention, a stream of hot combustion gases is introduced into the enlarged section of the reactor in such fashion as to produce high turbulence within the reactor with resultant efficient heat exchange between the combustion gases and the feed stock. Preferably and advantageously, the hot combustion gases are introduced tangentially to the enlarged reactor section 11 and, to this end, I have shown an inlet line 18 for hot combustion gases which communicates with tangential ports 19 and 20 formed in the enlarged section of the reactor. Alternately, burners for generating the hot combustion gases may be constructed immediately adjacent to the tangential ports, lines 18, 19, 20 serving to introduce fuel gas and combustion air to the burners. Any desired number of combustion gas ports may be disposed about the periphery of the vessel provided that they are arranged to produce concurrent flow of the combustion gas stream about the periphery of the vessel. In this manner, a swirling or helical movement of the combustion gases is produced about the axially moving feed and catalyst stream, producing an extremely intimate mixture of combustion gases, feed stock and catalyst with the result that the feed stock is efficiently converted by the action of the catalyst. In some cases, the combustion gases may be admitted axially, instead of tangentially, through ports spaced circumferentially about the inlet 13, although the efficiency is substantially less than that obtained by the preferred method. The fuel gas may be provided from an external source, or may comprise light products produced in the reactor. The fuel gas is burned with sufficient oxygen or air as to provide the desired conversion temperature within the reactor. In the preferred embodiment of the invention, the fuel gas has a thermal rating of 1,000 B. t. u. per cubic foot and this gas is admitted at the rate of 13,300 cubic feet per hour to produce a dehydrogenation temperature of 800 to 1200° F. within the reaction vessel, preferably about 1100° F.

The effluent passing from the reaction vessel through line 14 consists of converted hydrocarbons, combustion gases, and spent catalyst. This effluent may in some instances be advantageously quenched by admitting water or oil through a conduit 22 to the effluent line 14. The effluent is then fed to a separator 23, such as cyclone separator, from which the catalyst is removed through a line 24 and the product is removed overhead through a line 25. The spent catalyst may be removed from the system through a line 26 or, alernatively, it may be charged through a line 27 and a regeneration zone 28 to recycle line 16. In some instances it may be desired to regenerate only a portion of the catalyst, the remaining recycle catalyst being passed directly from line 27 to line 16 by means not shown. The product passing through line 25 may be separated in a manner familiar to those skilled in the art to recover converted hydrocarbons, recycle stock, and uncondensable gases from the fuel and feed streams. In the dehydrogenation of n-butane, the product passing through line 25 may consist of 15 per cent water, 69 per cent uncondensable gases, 7 per cent unsaturated hydrocarbons containing 4 carbon atoms, and 9 per cent of saturated hydrocarbons containing 4 carbon atoms. This last-named component may be advantageously recycled to feed conduit 13.

It will be apparent that the method of this invention affords a number of important advantages in that a simple, continuous method for conducting catalytic hydrocarbon conversion reactions is set forth. The quantity of heat added to the reaction system may be precisely controlled by varying the temperature, composition, or flow rate of the combustion gases without the use of elaborate catalyst cases, preheating furnaces, or control of the heat content through regulation of the catalyst temperature. Of course, in catalytic cracking, the hot regenerated catalyst may be returned to the reactor but the amount returned is not controlled by the necessity of supplying heat for the reaction. In addition, the present method is uniquely adapted for small installations due to the simplicity and ease of control of the process. In this connection, it will be noted that I have not shown all the necessary valves or other control equipment in the flow diagram as these may be readily provided in a manner well understood by those skilled in the art.

While the invention has been described in connection with a present, preferred embodiment thereof, it is to be understood that this description is illustrative only and is not intended to limit the invention, the scope of which is defined by the appended claims.

Having described my invention, I claim:

1. In the art of catalytically converting hydrocarbons, the steps which comprise passing a stream of hydrocarbon feed containing finely divided hard, solid conversion catalyst in an axial direction at conversion conditions, concomitantly introducing into contact with said stream at the periphery thereof and in a direction tangent to said periphery a stream of hot combustion gases and maintaining same as a blanket spirally swirling around and moving longitudinally along with the axial stream of feed and catalyst thus transferring heat from said combustion gases while at their highest temperature to said feed and catalyst, then forcing said axially flowing stream and spirally flowing blanket to flow within a path of smaller total diameter than previously but without change in axial direction and continuing conversion of said hydrocarbons, then forcing said axially flowing stream and spirally flowing blanket to flow within a path of still smaller total diameter than previously but without change in axial direction, subjecting the resulting intimate mixture of conversion products, catalyst, and combustion gases to quenching as they enter said flowpath of still smaller total diameter, said quenching being within a period of time much shorter than the conversion period within said smaller diameter flow-path, separating catalyst from the quenched mixed conversion products and combustion gases, and recovering converted hydrocarbons from the resulting mixture.

2. In the art of catalytically dehydrogenating a hydrocarbon feed stock, the steps which comprise passing a stream of hydrocarbon feed stock and a finely divided hard, solid dehydrogenation catalyst in an axial direction under dehydrogenation conditions, concomitantly introducing into contact with said stream at the periphery thereof and in a direction tangent to said periphery a stream of hot combustion gases and maintaining same as a blanket spirally swirling around and moving longitudinally along with the axial stream of feed and catalyst thus transferring heat from said combustion gases while at their highest temperature to said feed and catalyst, then forcing said axially flowing stream and spirally flowing blanket to flow within a path of smaller total diameter than previously but without change in axial direction and continuing dehydrogenation of said hydrocarbons, then forcing said axially flowing stream and spirally flowing blanket to flow within a path of still smaller total diameter than previously but without change in axial direction, subjecting the resulting intimate mixture of dehydrogenation products, catalyst, and combustion gases to quenching as they enter said flow-path of said still smaller total diameter, said quenching being within a period of time much shorter than the dehydrogenation period within said smaller diameter flow-path, separating catalyst from quenched mixed dehydrogenation products and combustion gases, and recovering dehydrogenated hydrocarbons from the resulting mixture.

HAROLD J. HEPP.

References Cited in the file of this patent

UNITED STATES PATENTS

| Number | Name | Date |
|---|---|---|
| 2,366,805 | Richker | Jan. 9, 1945 |
| 2,374,518 | Wolk et al. | Apr. 24, 1945 |
| 2,375,798 | Krejci | May 15, 1945 |
| 2,394,849 | Doumani et al. | Feb. 12, 1946 |
| 2,397,352 | Hemminger | Mar. 26, 1946 |
| 2,413,407 | Dreyfus | Dec. 31, 1946 |